Figure 1:
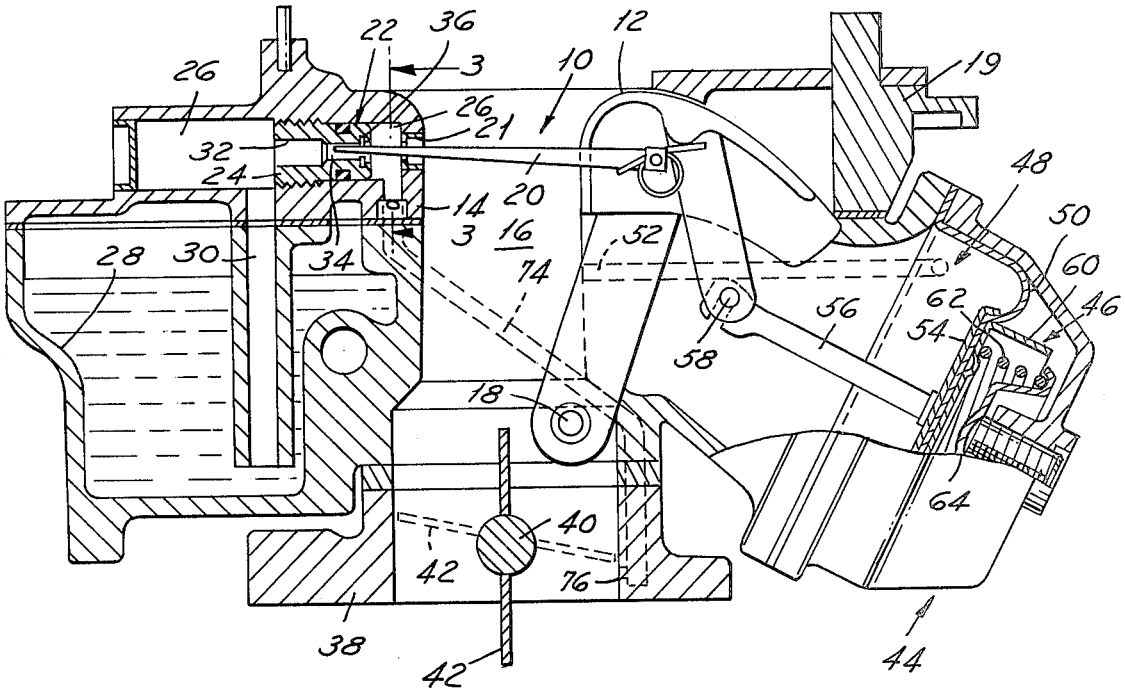
Figure 3:
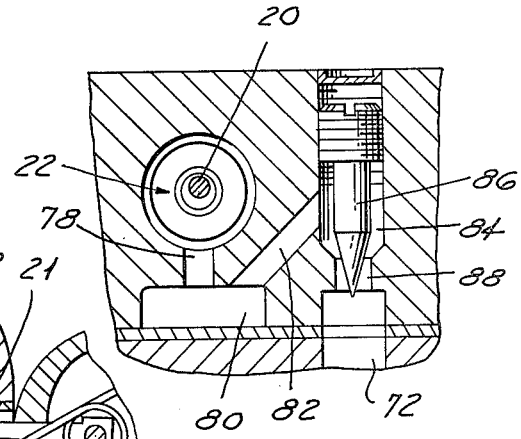
Figure 2:
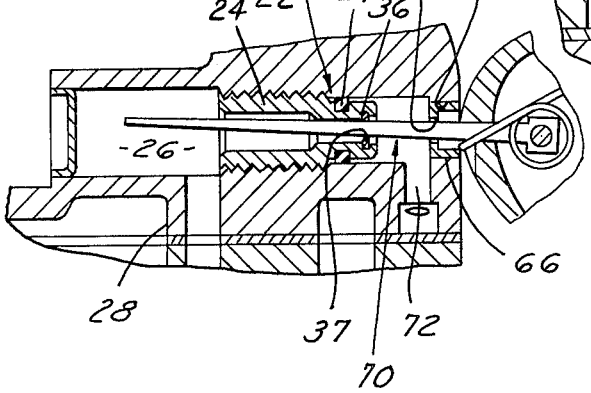
Figure 4:
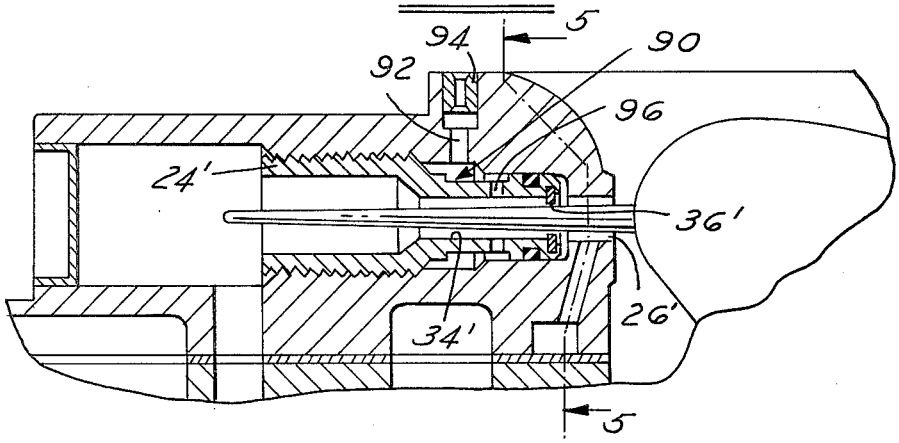
Figure 5:
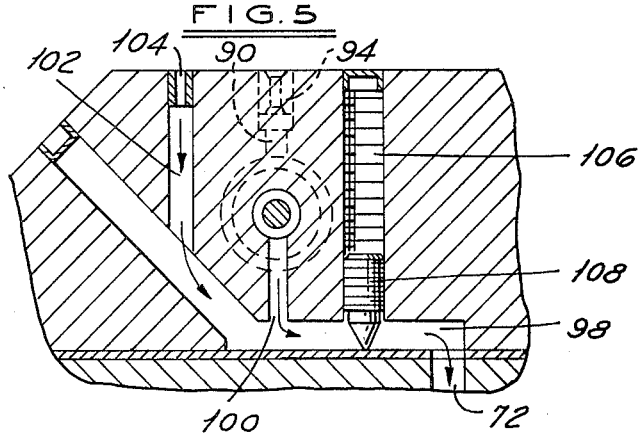
Figure 6:
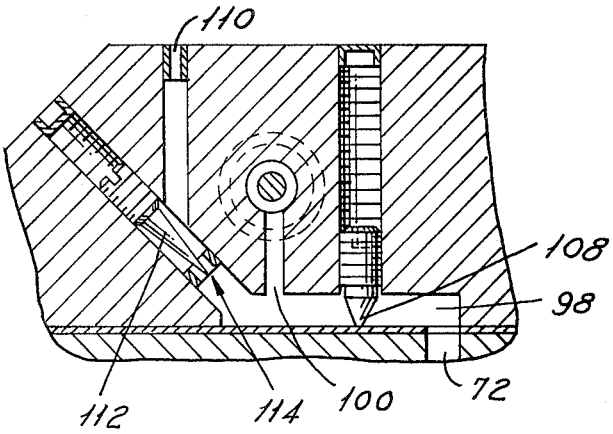

United States Defensive Publication [19] (H) [11] T997,003

Dirda [43] Aug. 5, 1980

[54] IDLE SYSTEM FUEL CONTROL FOR VARIABLE AREA VENTURI CARBURETOR

[76] Inventor: John Dirda, 25320 Shiawssee, Southfield, Mich. 48075

[21] Appl. No.: 770,162

[22] Filed: Feb. 18, 1977

Related U.S. Application Data

[63] Continuation of Ser. No. 662,471, Mar. 1, 1976, abandoned.

[51] Int. Cl.[2] ..... F02M 9/06

[52] U.S. Cl. ..... 261/41 D; 261/44 R; 261/121 B

[57] ABSTRACT

A variable area venturi carburetor has a movable venturi wall with a fuel metering rod attached for cooperation with a fuel jet located near an opening in the fixed venturi wall portion, a bypass passage connected to the connecting chamber between the fuel jet and the wall opening siphoning off the fuel at closed positions of the throttle valve to prevent stumbling of the engine by fuel flowing into the main venturi and clogging the small clearance space between the throttle valve and induction passage wall.

1 Claim, 2 Sheets Drawing,

14 Pages Specification

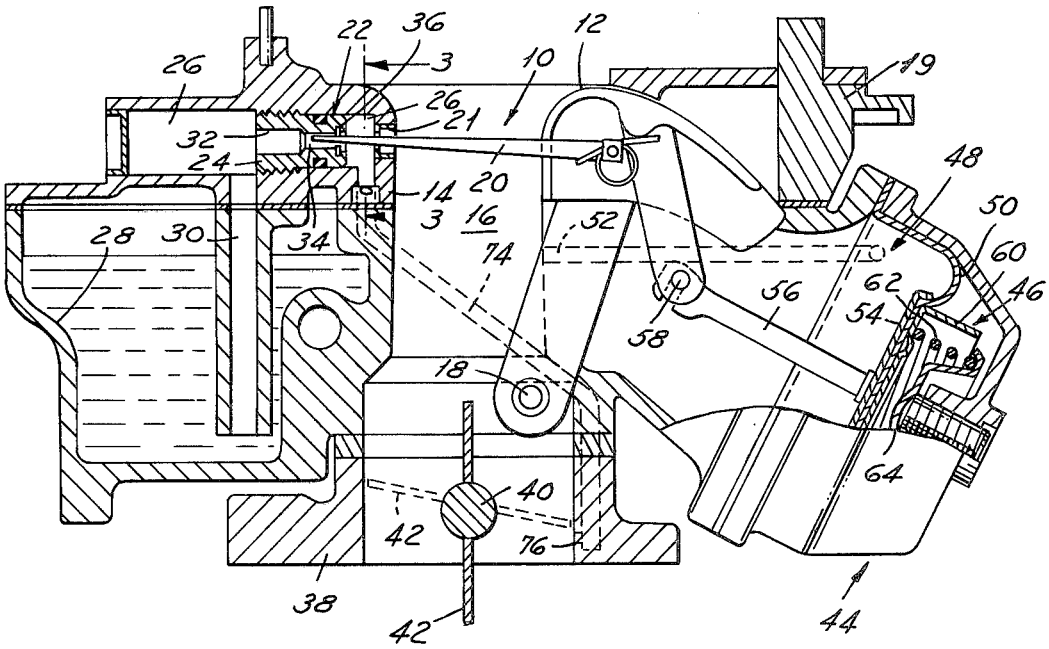

The file of this unexamined application may be inspected and copies thereof may be purchased (849 O.G. 1221, Apr. 9, 1968).